United States Patent
Ham et al.

[11] Patent Number: 5,984,580
[45] Date of Patent: Nov. 16, 1999

[54] LANDFILL BIOREACTOR

[75] Inventors: Robert K. Ham, Madison; Daniel R. Viste, Mazomanie, both of Wis.

[73] Assignee: Montgomery Watson, Madison, Wis.

[21] Appl. No.: 08/891,673

[22] Filed: Jul. 11, 1997

Related U.S. Application Data

[60] Provisional application No. 60/029,776, Oct. 29, 1996.

[51] Int. Cl.$^6$ .............................. B09B 1/00; B09B 3/00; C02F 3/28
[52] U.S. Cl. ...................... 405/129; 210/630; 210/901; 435/262.5
[58] Field of Search ..................... 405/128, 129; 210/630, 747, 901; 241/DIG. 36; 435/262.5

[56] References Cited

U.S. PATENT DOCUMENTS

| | | |
|---|---|---|
| 4,159,944 | 7/1979 | Erickson et al. ................... 210/901 X |
| 4,323,367 | 4/1982 | Ghosh . |
| 4,396,402 | 8/1983 | Ghosh . |
| 4,643,111 | 2/1987 | Jones . |
| 4,798,801 | 1/1989 | Hitzman . |
| 5,139,365 | 8/1992 | Chesner . |
| 5,184,780 | 2/1993 | Wiens ...................... 241/DIG. 38 X |
| 5,201,609 | 4/1993 | Johnson . |
| 5,230,586 | 7/1993 | Bachhausen et al. ................... 405/128 |
| 5,261,766 | 11/1993 | Anderson . |
| 5,269,634 | 12/1993 | Chynoweth et al. . |
| 5,288,170 | 2/1994 | Cummings . |
| 5,356,452 | 10/1994 | Fahey ................................... 405/129 X |
| 5,413,432 | 5/1995 | Cummings . |
| 5,441,552 | 8/1995 | DeLillo . |
| 5,451,249 | 9/1995 | Spiegel et al. . |
| 5,605,417 | 2/1997 | Englert et al. .......................... 405/129 |
| 5,636,941 | 6/1997 | Davis et al. ............................ 405/129 |
| 5,744,041 | 4/1998 | Grove ................................... 210/630 X |

*Primary Examiner*—George Suchfield
*Attorney, Agent, or Firm*—DeWitt Ross & Stevens SC

[57] ABSTRACT

Disclosed is a method of producing a landfill and the landfill produced thereby wherein waste to be landfilled is comminuted to yield homogeneously-sized waste particles, mixed with liquid wastes such as waste water treatment sludges and the like, and then placed into a sanitary containment site with a leachate and gas collection system such that there is a uniform moisture distribution throughout the waste mass. Leachate collected from the waste mass is uniformly re-introduced into the waste mass so as to maintain the uniform moisture distribution. The landfill produced thereby maximizes anaerobic fermentation within the waste mass, thereby maximizing the production of valuable landfill gasses.

14 Claims, 2 Drawing Sheets

LANDFILL BIOREACTOR

This application claims priority to pending provisional patent application Ser. No. 60/029,776, filed Oct. 29, 1996.

FIELD OF THE INVENTION

The present invention is directed to landfilling techniques which encourage aerobic and anaerobic biodegradation of solid and liquid waste material, thereby yielding increased amounts of valuable landfill gasses and accelerating chemical stabilization and physical size reduction of the waste mass.

DESCRIPTION OF THE PRIOR ART

Increased production of municipal solid waste (MSW), sludge from wastewater treatment plants, and commercial waste throughout industrialized and rapidly industrializing countries has created tremendous pressures to find space in which to dispose of the waste. Coupled with concerns regarding waste migration and potential long-term environmental effects of landfills, much ongoing research has been undertaken to recover reusable materials from waste streams and to safely dispose the unreclaimable matter.

Conventional landfills are designed to entomb solid waste in a dry condition and to minimize the amount of moisture which contacts the waste. These "dry tomb" landfills are lined with a containment layer to prevent migration of liquid from the site and a drainage system to collect the liquid which accumulates at the bottom of the landfill. This liquid is called leachate. In conventional landfills, leachate is collected from the drainage layer by a system of pipes and then treated to remove any the contaminants contained therein. The contaminants are put back into the fill and the treated water discharged to the environment.

The primary goal of a dry tomb landfill is to prevent migration of liquid wastes from the landfill site. While this is certainly a valid concern, dry tomb landfilling does little to actually treat or stabilize the waste contained within the landfill. While only the passage of time will tell, there is generally agreement that dry entombed waste will remain largely unchanged for centuries, until such time as the containment layer of the landfill fails. At that point, the leachate will no longer be contained within the landfill and will migrate from the landfill site. As a consequence, dry tomb landfills must be monitored, for all practical purposes, in perpetuity.

It is also, however, commonly acknowledged that the lack of moisture within conventional landfills limits the extent of anaerobic digestion that naturally occurs in landfills. As a consequence, some landfill operators have begun to recirculate the leachate back into the landfill. This not only adds moisture to the waste, but also postpones or reduces having to treat the leachate. The leachate, however, as well as other liquids such as biosolids from sewage treatment plants and the like, is not uniformly mixed with the solid waste contained in the landfill. Rather, liquid introduced into landfills is placed solely according to the convenience of the operator. As a result, the waste is not exposed to a uniform level of moisture.

The heterogeneous condition of wastes placed into landfills also causes the channelling of moisture through paths of minimum resistance in the waste mass. Because little or no pre-disposal waste processing takes place in conventional landfilling (with the exception of the removal of certain recyclables), large channels within the heterogeneous waste mass direct added liquids and rain water quickly to the bottom of the landfill. This further contributes to the lack of moisture within the bulk of the waste mass, which in turn limits the amount of microbial degradation within large portions of the landfill.

In the patent literature, Ghosh, U.S. Pat. No. 4,369,402, issued Aug. 2, 1983, describes a multi-step method of improving gas production from landfills by accelerating bioleaching of the organic materials within the landfill. In a first step, organic material within a landfill are inoculated with an aqueous culture of anaerobic, acid-forming microorganisms under growth conditions. The culture also contains nutrients to ensure the growth of the microorganisms. The action of the microorganisms produces liquid by-products which filter through the waste mass and are collected by a sump pump. By the time the liquid reaches the sump, the microorganisms have become inactive, presumably due to the lack of utilizable substrates. In a second step, the liquid by-products and the inactivated microorganisms are then collected and passed to an acid-phase digestion zone for reactivation of the acid-forming microbes.

In a third step, the supernatant from the acid-phase digestion is then passed to a methane-phase digestion zone containing methane-producing microorganisms. The re-activated acid-producing microorganisms are then recirculated in the first step (i.e., to inoculate the waste). Low BTU gas is withdrawn from the acid-phase digestion tank and high BTU gas is withdrawn from the methane-phase digestion tank. The major drawback to this approach is that it requires large reaction vessels for the acid-phase and methane-phase digestion.

Jones, U.S. Pat. No. 4,643,111, issued Feb. 17, 1987, describes a landfill completely enclosed within a large vapor-tight container. Methane formed by anaerobic fermentation within the landfill migrates to the top of the enclosure, where it is collected.

Another patent describing means for generating methane by anaerobic fermentation of waste material is Hitzman, U.S. Pat. No. 4,798,801, issued Jan. 17, 1989. Here, a first cavity is dug into the earth and partially filled with waste. A second cavity is then dug, and the earth removed from the second cavity used to cap the first. The process is repeated to yield a series of sealed cavities and open cavities in the process of being filled. Gasses are withdrawn from the sealed cavities, the methane concentrated therefrom, and the remaining carbon dioxide is then injected back into the sealed cavities. By injecting carbon dioxide into the sealed cavities, oxygen is purged from the cavities and anaerobic fermentation thereby encouraged. Cultures of methanogenic organisms may be injected into the sealed cavities along with the carbon dioxide.

Chesner, U.S. Pat. No. 5,139,365, issued Aug. 18, 1992, describes a method for injecting waste into the voids of an existing landfill waste mass so as to more effectively utilize landfill space. This patent makes brief reference to "controlled" landfilling techniques such as mixing solid waste with sludges, buffers, water, etc. prior to landfilling. The object of such "controlled" landfilling is to create an environment within the landfill which is conducive to the growth of methanogenic organisms.

None of the above references, taken alone or in any combination, is seen as describing or suggesting the invention described and claimed herein.

SUMMARY OF THE INVENTION

A first embodiment of the invention is drawn to a method of landfilling solid and liquid waste. The method comprises comminuting solid waste to yield solid waste particles having an approximately uniform particle size distribution. The solid waste particles are mixed or sprayed with liquid waste or water to yield a uniformly-moistened waste admixture. The moistened waste admixture is then disposed within a containment site in such a fashion that anaerobic degradation occurs, the containment site having means for collecting leachate and means for uniformly re-injecting the collected leachate back into the waste admixture. Leachate generated from the waste admixture is then collected and uniformly recirculated back into the waste admixture, whereby a uniformly-moistened waste admixture is maintained.

A second embodiment of the invention is drawn to a method of landfilling solid and liquid waste which comprises comminuting solid waste to yield solid waste particles having an approximately uniform particle size distribution. The solid waste particles are mixed or sprayed with landfill leachate to yield a uniformly-moistened waste admixture. The waste admixture is then disposed within a containment site having means for collecting leachate. The leachate generated from the waste admixture is then collected and used to mix with newly-incoming solid waste.

A third embodiment of the invention is drawn to a method of landfilling solid and liquid waste which comprises comminuting solid waste to yield solid waste particles having an approximately uniform particle size distribution. The solid waste particles are mixed or sprayed with liquid waste or water to yield a uniformly-moistened waste admixture. The moistened waste admixture is then loosely placed within a containment site in a fashion such that aerobic degradation occurs. The waste admixture is then disposed within the containment site in such a fashion that anaerobic degradation occurs. This can be accomplished by compaction or any other means whereby oxygen is purged from the waste admixture. As in the preceding embodiments, the containment site includes means for collecting leachate and means for uniformly re-injecting the collected leachate back into the waste admixture. Leachate generated from the waste admixture is then collected and uniformly recirculated back into the waste admixture, whereby a uniformly-moistened waste admixture is maintained.

Yet another embodiment of the invention is drawn to an improvement in conventional landfilling techniques. Here, in conventional landfilling in a containment site having means for collecting leachate and means for collecting gasses emanating from the containment site, the improvement comprises comminuting incoming solid waste to yield solid waste particles having an approximately uniform particle size distribution. The solid waste particles are mixed or sprayed with liquid waste or water to yield a uniformly-moistened waste admixture. The waste admixture is then disposed within the containment site. Leachate generated from the waste admixture is then collected and mixed with newly-incoming solid waste.

Because conventional landfill construction methods aim to minimize the amount of water and other liquids which contact the waste, the formation of leachate from conventional landfills is likewise minimized. While limiting leachate production minimizes the risks of liquid waste migration from the landfill site, such "dry tomb" landfills do not encourage aerobic and anaerobic degradation of the wastes contained within the landfill. However, by encouraging both aerobic and anaerobic degradation within a stable landfill, the invention yields several notable benefits:

By encouraging microbial growth and metabolism, various toxic substances within the landfill are degraded by the action of the microbes into less-toxic or non-toxic by-products.

The overall increase in microbial activity and the even distribution of microbial activity within the landfill greatly increases the amount of gas produced (and hence energy recovered) from the landfill. Gas production and energy recovery from landfills constructed according to the present invention is much greater than from conventional landfills.

The long-term cost of monitoring the landfill is also reduced because the dangerous wastes contained within the landfill are more quickly broken down into stable compounds. Rapid stabilization of the material within the landfill equates to decreased long-term costs attributable to monitoring of the site.

Because bulky waste is more quickly degraded using the present invention, more gate tons of waste can be placed into the landfill during its operational lifetime. Because older wastes are extensively degraded into liquid and gas and thereby reduced in volume, the landfill site is utilized more efficiently and completely. The increased rate of physical size reduction also enables more efficient use of the landfill space during its active lifetime.

Additionally, because the invention utilizes wastewater sludges and the like to moisten incoming waste, wastewater treatment costs are reduced because they do not have to be dried as extensively prior to being placed into the containment site. In fact, certain types of wastewater can be placed directly into the landfill to encourage anaerobic fermentation.

The overall effect is a vast increase in the rate of conversion of solid waste and liquid into useable landfill gasses, with a concomitant increase in the rate of reduction and stabilization of the waste mass. This conversion and resultant settlement allows more waste to be placed into any given fixed amount of space.

These and other aims, objects, and advantages of the landfill described herein will become apparent upon a complete reading of the Detailed Description made in conjunction with the attached drawing figures.

DETAILED DESCRIPTION OF THE INVENTION

Comminution of Solid Waste

Figure 1:
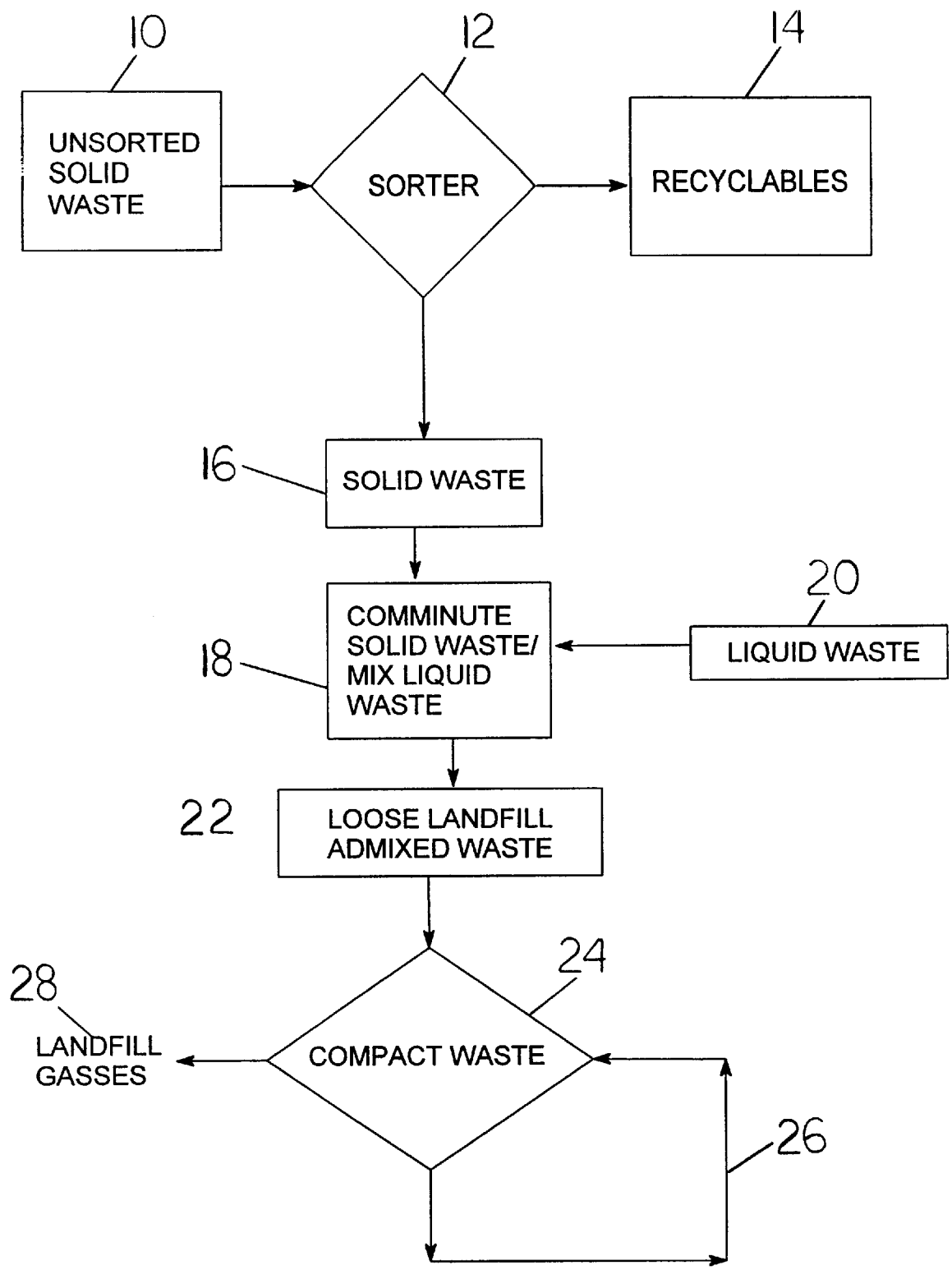
FIG. 1 is a flow diagram depicting construction of a landfill according to the present invention.

For the discussion which follows, it is assumed that the waste stream to be landfilled has already been processed for removal of recyclable material. For obvious economic reasons, if the waste stream to be processed contains valuable recyclable materials, prudence dictates that these materials be separated from the remaining waste. Referring to the flow chart depicted in FIG. 1, unsorted solid waste 10 is sorted 12 for reclamation of any valuable recyclables 14 contained therein. Solid waste 16 is then slated for landfilling according to the present invention.

In a first step of the invention, the solid waste 16 to be placed into the containment site is comminuted 18 to yield waste particles having a roughly uniform particle size distribution. This can be accomplished by conventional means such as large-scale mixing equipment, shredders, crushers, and the like. The comminuted waste may be passed through a sieve or other means for selection to ensure that the waste has been sufficiently comminuted.

For reasons discussed below, a smaller average particle size of the waste is generally preferred to a larger average particle size, at least in terms encouraging decomposition of the waste. However, the composition of the waste itself must also be taken into consideration. Waste streams vary from location to location and even from day to day at the same location.

Comminuting the waste to a roughly uniform average particle size furthers four distinct goals. The first goal is to expose the maximum amount of waste surface area to moisture and methanogenic microorganisms. This greatly hastens the decomposition and ultimate stabilization of the waste mass. It also increases the amount of methane produced within the waste mass.

The second goal is to afford maximum density of the waste, thereby maximizing the efficient utilization of valuable containment space. Non-comminuted waste creates a significant and often very large proportion of void space within the landfilled waste mass. (Imagine, for instance, the amount of void space occupied by a waste tire). Even degradable wastes such as food, paper, cloth, agricultural, lawn, and garden wastes, occupy a large amount of void space in their non-comminuted state. However, these wastes are easily comminuted and highly compressible. Comminuting the waste allows it to be efficiently and uniformly compacted while minimizing the amount of void space within the waste mass.

The third goal of comminuting the waste is to inhibit channelling of moisture from the top of the waste mass to the bottom via paths of least resistance. If a clear channels (i.e., void spaces) exist within the waste mass, moisture quickly passes through the voids without uniformly contacting the waste. Comminuting the waste into particles of roughly uniform size distribution minimizes channeling by facilitating tighter and more uniform packing of the waste material, without the formation of void spaces. The minimization of channelling encourages uniform wetting of the waste and uniform moisture movement through the waste mass. Minimizing channelling also encourages moisture retention within the waste mass. In other words, the amount of time it takes for gravity to move an amount of water from the top of the waste mass to the bottom of the containment site is greatly increased by comminuting the waste to a roughly uniform particle size which discourages channelling.

Channelling is also inversely proportional to the average particle diameter of the waste. A smaller average particle diameter yields a smaller average channel size, thereby encouraging retention of moisture within the waste mass.

The fourth goal, or perhaps more correctly advantage, of comminuting the waste stream is an increased predictability of leachate mobility through the waste mass. Poiseulle's law can be used to model the passage of a liquid through a network of small, uniform passages. In its simplest embodiment, Poiseulle's law dictates that the volumetric rate of liquid passing through a uniform network of passages is directly proportional to the applied pressure, inversely proportion to the viscosity of the liquid, and directly proportional to the fourth power of the size of the average passage opening. However, the predictive power of Poiseulle's law breaks down when the network of passages is not uniform, as is the case in conventional landfills. In the present invention, because the waste stream is rendered into a more uniform set of compacted particles, the size distribution of the passage openings is far more narrow, thereby allowing more accurate modeling of the passage of liquid through the waste mass. The ability to accurately model passage of water through the waste mass is useful for estimating such parameters as future leachate production, landfill gas production and mobility, waste mass subsidence, and waste mass stabilization.

Mixing Solid and Liquid Waste

In a second step of the invention, the waste is mixed or sprayed with liquid waste matter or added water 20. Here, the goal is to achieve a roughly uniformly-moistened waste admixture. Mixing or spraying of the solid waste with the liquid waste (or added water) can be performed simultaneously with the above-described comminution step, or subsequent thereto, or at the point where the waste is placed into the containment site.

The point at which the solid waste is moistened is not particularly critical to the operation of the invention, so long as a roughly uniformly-moistened waste admixture is obtained. The choice of when and how to perform the mixing step is largely based upon the convenience of the landfill operator and the readily-available equipment at his or her command. In many instances, it is advantageous to combine the comminution and mixing steps together because wetting the incoming waste stream generally facilitates particle size reduction. Additionally, mixing the solid waste with liquid waste during the comminution step tends to distribute the moisture evenly throughout the waste.

Liquid waste suitable for mixture with the solid waste includes wastewater treatment biosolids from industrial or municipal treatment operations, food wastes, agricultural wastes, landfill leachate, fermentation and brewery waste, pharmaceutical and biotechnology waste, ethanol and other chemical production wastes, and other liquids and sludges with organic nutrients. Added water may also be mixed with the solid waste. The amount and type of liquid waste (as well as solid waste) at any given facility is wholly dependent upon the types of waste generated by those industries and municipalities who dispose of their waste at the facility. However, this is not a concern as there is clearly an overabundance of all types of waste for disposal. Landfill operators will not be left unable to practice the invention for a lack of liquid or solid waste for the foreseeable lifetime of any patent issuing herefrom.

The preferred liquid waste to be mixed with the incoming solid waste is the leachate collected from the growing waste mass itself. This, of course, defers having to treat the collected leachate and also provides a captive source for liquid waste for use in the invention.

Liquid waste streams such as the ones noted above are excellent nutrient sources for aerobic and anaerobic microorganisms. By thoroughly and uniformly mixing the solid waste with the liquid waste, an environment for vigorous and flourishing microbial growth is created. When the uniformly-moistened waste admixture is landfilled, the landfilled waste mass will act as a bioreactor for the production of methane and the rapid degradation, stabilization, and physical reduction of the waste mass. This is in direct contrast to conventional landfilling, where the dry storage conditions function as a desiccated tomb for the essentially timeless mummification of solid waste.

Placement of Waste into Containment Site

Once the liquid and solid waste has been comminuted and mixed to render a uniformly-moistened waste admixture, the admixture is disposed within a containment site which includes means for collecting leachate and means for uniformly re-injecting the collected leachate back into the waste admixture.

Placement of the waste within the containment site is generally done at the convenience of the operator, with or without daily cover. It is preferred, however, that any earthen daily cover also be stripped daily to minimize the amount of non-waste material placed into the containment structure. Most preferred is the use of retractable daily cover, such as impervious sheeting and the like. In general, it is most desirable that the disposed waste mass take the form of an integral, homogeneous, and uniformly dispersed mass with no intervening breaks or voids.

Where containment space permits, a preferred placement scheme comprises placing the waste admixture loosely onto an operating face of the landfill 22 and then allowing the waste to remain loosely packed for a matter of days or weeks. Aerobic digestion of the waste begins essentially immediately, and the loosened state of the waste admixture allows aerobic digestion to continue for quite some time. The goal here is to encourage aerobic digestion of waste constituents which are not amenable to anaerobic degradation (such as lignins). The presence of a large amount of such components might limit the extent of anaerobic degradation if the waste mass is directly compacted to a tight, uniform density.

Taking lignin for example, the cellulose associated with lignin cannot be easily degraded due to the complexity of the lignin-cellulose structure. By allowing the waste to aerobically digest for a period of time, however, cellulosic compounds are freed from the lignin structure and easily digested. Consequently, more complete digestion (and more rapid stabilization) of the waste mass is achieved when a period of aerobic digestion precedes compaction of the waste mass (with subsequent anaerobic digestion). Additionally, an increase in cellulosic substrates for anaerobic degradation translates into a corresponding increase in gas production.

After a period of aerobic degradation, the waste is then compacted into a tight, anaerobic mass in standard fashion 24. This is accomplished using conventional landfill packing machinery.

Leachate Recirculation and Recovery of Landfill Gasses

The objects of the invention can only fully be achieved if the containment site into which the waste is placed includes means for collecting leachate and means for uniformly re-injecting the collected leachate back into the waste admixture. This allows the waste mass to be kept uniformly moist by collecting and redistributing the leachate throughout the waste mass, as needed. In FIG. 1, the means for collecting leachate and means for uniformly re-injecting the collected leachate back into the waste admixture are depicted by recirculation loop 26.

Leachate recirculation can be accomplished by any means known to the art, so long as the means for recirculation of leachate are employed to yield a generally homogenous redistribution of the leachate into the fill. Means for leachate recirculation include, without limitation, surface spraying, surface ponds, vertical injection wells (with or without wicks), and horizontal surface infiltration devices. All of these means for leachate recirculation function with similar success. Consequently, the preferred means for recirculation of leachate for any given landfill formation is chosen based upon the size, design, and geography of the landfill site and upon the budget of the landfill operator. In general, the means for leachate collection and recirculation includes a sump pump at the bottom of the containment site which is operationally connected to the inlet of a conduit system. The conduit directs collected leachate to the top of the waste mass. The conduit contains one or more outlets which are strategically placed and controlled by valves such that the collected leachate can be applied to the waste mass in the locations desired.

In order to fully enjoy the benefits of the present invention, the containment site should also include means for collecting valuable landfill gasses 28. Means for collecting landfill gas, as well as means for monitoring the production of landfill gas within the landfill and means for directly utilizing, flaring, or separating the collected gas into its component gasses for subsequent use, are all well known to the art and need not be discussed in detail here. The means for monitoring, collecting, and using landfill gas are not critical to the operation of the present invention. Any such means for monitoring, collecting, using, or flaring landfill gas currently known or developed in the future can be successfully utilized in the present invention. For example, one means for monitoring landfill gases is by periodically tracking the composition of the landfill gas spectrophotometrically. Methane and carbon dioxide have characteristic spectra which can be monitored automatically.

Means for collecting landfill gas generally includes liquid conduit means connected at one end to space within and above the waste mass and connected at the other end to means for pumping the gas from within the waste mass to another location when the gas is needed.

Means for separating the gas into its component parts includes any number of conventional and well-known devices such as solvent, water, or steam scrubbers.

If desired or necessary, methanogenic cultures may also be injected into the waste mass to encourage vigorous bacterial growth within the landfilled waste. Core samples of the waste mass can be taken to monitor the growth of anaerobic bacteria within the mass. If portions of the waste mass are found wanting in anaerobic bacterial growth, cultures of methanogenic organisms, along with suitable nutrients therefor, may be injected into the waste mass.

Landfill According to the Present Invention

Figure 2:
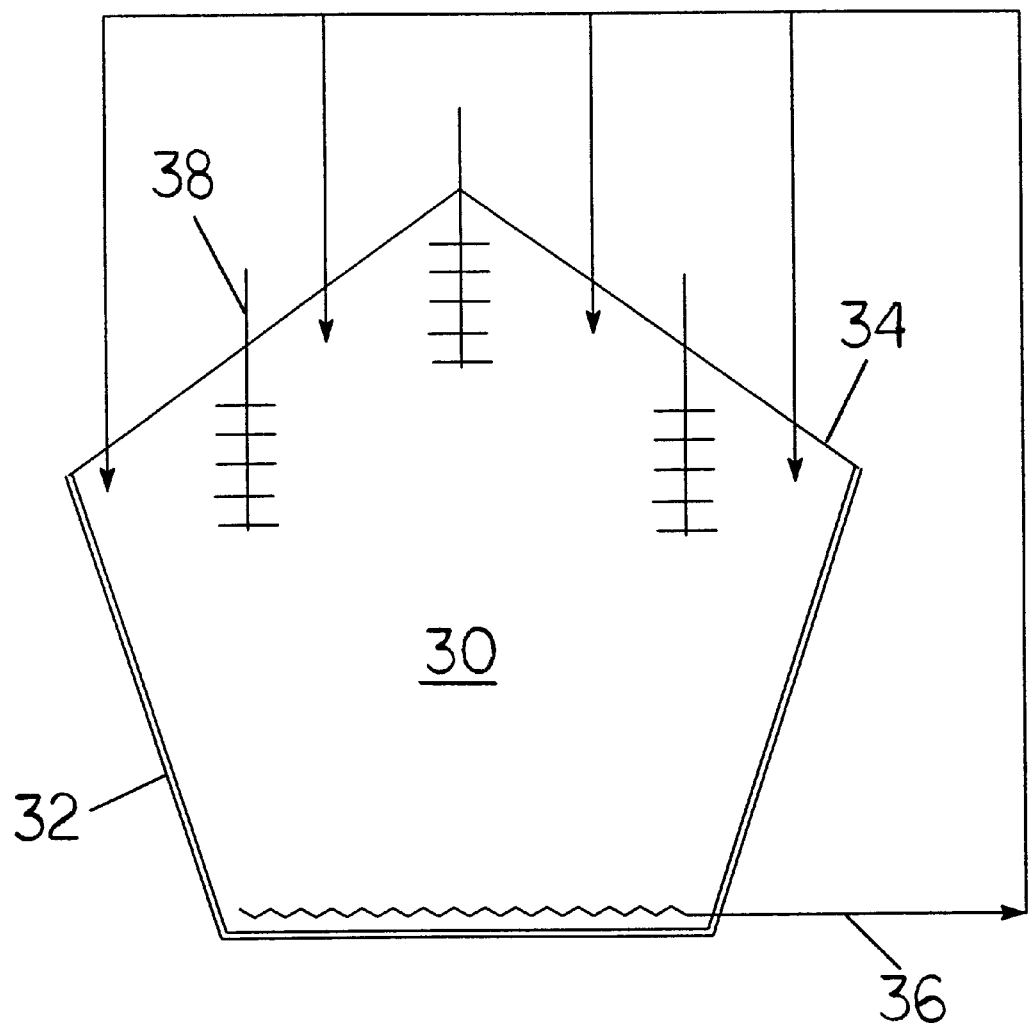
FIG. 2 is a schematic diagram of a landfill constructed according to the present invention.

FIG. 2 depicts a schematic diagram of a landfill constructed according to the present invention. The containment site itself includes a containment layer 32 and a cap 34. The containment site is also equipped with means for collecting leachate and means for uniformly re-injecting the collected leachate back into the waste admixture 36 and means for collecting gasses emanating from the waste admixture 38. The comminuted and moistened waste itself is compacted within space 30.

Leachate is collected and recirculated back into the waste mass by means 36, thereby maintaining the uniform moisture level of the waste mass. Landfill gasses produced within the waste are collected by means 38 and processed post-collection to yield valuable methane. Methane collected from the waste mass can be used to power the machinery employed to comminute the incoming waste stream, as well as the leachate recirculation means, etc.

The landfill methodology described hereinabove is not limited to the processes and elements expressly disclosed herein, but rather encompasses all such equivalent modifications thereof as come within the scope of the attached claims.

What is claimed is:

1. A method of landfilling solid and liquid waste comprising:
    (a) comminuting solid waste to yield solid waste particles having an approximately uniform particle size distribution; and
    (b) mixing or spraying the solid waste particles with liquid waste or water to yield a uniformly-moistened waste admixture; then
    (c) disposing the waste admixture within a containment site such that anaerobic fermentation occurs, the containment site having means for collecting leachate and means for uniformly re-injecting the collected leachate back into the waste admixture; and then (d) collecting leachate generated from the waste admixture and uniformly recirculating the leachate into the waste admixture, whereby a uniformly-moistened waste admixture is maintained.

2. The method of claim 1, further comprising the step of, subsequent to step (c), collecting landfill gas generated from within the waste admixture.

3. The method of claim 1, wherein step (c) further comprises placing the waste admixture loosely onto an operating face of the containment site such that aerobic degradation occurs, and then disposing the waste admixture within the containment site such that anaerobic fermentation occurs.

4. The method of claim 3, wherein subsequent to aerobic degradation, the waste admixture is disposed by compacting the waste admixture, whereby anaerobic fermentation occurs.

5. The method of claim 3, further comprising the step of, subsequent to disposing the waste admixture, inoculating the waste admixture with anaerobic, methanogenic microorganisms.

6. The method of claim 1, wherein comminuting the solid waste and mixing the solid waste particles occur simultaneously.

7. The method of claim 1, wherein in step (b), the solid waste particles are mixed or sprayed with wastewater treatment sludges from industrial or municipal treatment water treatment plants, liquid food wastes, liquid agricultural wastes, landfill leachate, waste ethanol, or water.

8. The method of claim 1, wherein the leachate collected in step (d) is used as the liquid waste in the mixing or spraying of step (b).

9. A method of landfilling solid and liquid waste comprising:

(a) comminuting solid waste to yield solid waste particles having an approximately uniform particle size distribution: and (b) mixing or spraying the solid waste particles with landfill leachate to yield a uniformly-moistened waste admixture; then (c) disposing the waste admixture within a containment site such that anaerobic fermentation occurs, the containment site having means for collecting leachate; and then (d) collecting leachate generated from the waste admixture and using the collected leachate in step (b).

10. The method of claim 9, further comprising the step of, subsequent to step (c), collecting landfill gas generated from within the waste admixture.

11. The method of claim 9, wherein step (c) further comprises placing the waste admixture loosely onto an operating face of the containment site such that aerobic degradation occurs, and then disposing the waste admixture within the containment site such that anaerobic degradation occurs.

12. The method of claim 11, wherein subsequent to aerobic degradation, the waste admixture is disposed by compacting the waste admixture, whereby anaerobic fermentation occurs.

13. The method of claim 9, further comprising the step of, subsequent to disposing the waste admixture, inoculating the waste admixture with anaerobic, methanogenic microorganisms.

14. The method of claim 9, wherein comminuting the solid waste and mixing the solid waste particles occur simultaneously.

* * * * *